(12) United States Patent
Mehta et al.

(10) Patent No.: US 8,924,308 B1
(45) Date of Patent: Dec. 30, 2014

(54) APPARATUS AND METHOD FOR SECURE FULFILLMENT OF TRANSACTIONS INVOLVING VIRTUAL ITEMS

(75) Inventors: Kaushal N. Mehta, Fremont, CA (US); Dan Elias Kolkowitz, Los Altos Hills, CA (US)

(73) Assignee: Playspan, Inc., Santa Clara, CA (US)

( * ) Notice: Subject to any disclaimer, the term of this patent is extended or adjusted under 35 U.S.C. 154(b) by 1406 days.

(21) Appl. No.: 12/176,181

(22) Filed: Jul. 18, 2008

Related U.S. Application Data

(60) Provisional application No. 60/950,404, filed on Jul. 18, 2007.

(51) Int. Cl.
```
G06Q 20/00     (2012.01)
G06Q 20/12     (2012.01)
G06Q 20/38     (2012.01)
G07F 17/32     (2006.01)
G06Q 20/40     (2012.01)
G06Q 20/02     (2012.01)
```

(52) U.S. Cl.
CPC ........ *G06Q 20/1235* (2013.01); *G06Q 20/3829* (2013.01); *G07F 17/3241* (2013.01); *G06Q 20/40975* (2013.01); *G06Q 20/3821* (2013.01); *G06Q 20/02* (2013.01)
USPC ...................... 705/64; 705/50; 463/29; 463/1

(58) Field of Classification Search
None
See application file for complete search history.

(56) References Cited

U.S. PATENT DOCUMENTS

| | | | |
|---|---|---|---|
| 5,602,997 A * | 2/1997 | Carpenter et al. | 715/764 |
| 6,061,792 A * | 5/2000 | Simon | 713/176 |
| 6,343,738 B1 * | 2/2002 | Ogilvie | 235/381 |
| 6,721,886 B1 * | 4/2004 | Uskela | 713/168 |
| 7,152,782 B2 | 12/2006 | Shenker et al. | |
| 7,376,629 B1 * | 5/2008 | McIsaac et al. | 705/78 |
| 7,572,187 B2 * | 8/2009 | Van Luchene | 463/42 |
| 7,702,916 B2 | 4/2010 | Seaton, Jr. et al. | |
| 8,010,428 B2 | 8/2011 | Maw et al. | |
| 2002/0026374 A1 * | 2/2002 | Moneymaker et al. | 705/26 |
| 2003/0028484 A1 * | 2/2003 | Boylan et al. | 705/40 |
| 2003/0177187 A1 | 9/2003 | Levine et al. | |
| 2005/0137015 A1 * | 6/2005 | Rogers et al. | 463/42 |
| 2005/0289008 A1 * | 12/2005 | Olivier et al. | 705/22 |
| 2007/0037552 A1 | 2/2007 | Lee et al. | |
| 2007/0087831 A1 | 4/2007 | Van Luchene et al. | |
| 2007/0111770 A1 | 5/2007 | Van Luchene | |

(Continued)

OTHER PUBLICATIONS

Schiesel, S.; "Entropria Universe Players Can Cash Their Online Earnings at the A.T.M."; New Your Times, May 2, 2006, 2 pages.

(Continued)

*Primary Examiner* — Calvin L Hewitt, II
*Assistant Examiner* — Tim Hale
(74) *Attorney, Agent, or Firm* — Kilpatrick Townsend & Stockton LLP

(57) ABSTRACT

A computer implemented method to exchange virtual goods in a virtual environment includes receiving funds at a trading platform from a buyer. The buyer is provided with a first secret that the buyer can decrypt and a second secret that the buyer cannot decrypt. The buyer is authenticated to a seller using the first secret. A virtual item is delivered from the seller to the buyer in response to authenticating. The buyer delivers to the seller the second secret for decryption by the seller. The seller is authenticated at the trading platform with the second secret. The seller is supplied with the funds.

21 Claims, 4 Drawing Sheets

(56) References Cited

U.S. PATENT DOCUMENTS

| | | |
|---|---|---|
| 2007/0117615 A1 | 5/2007 | Van Luchene |
| 2007/0129124 A1 | 6/2007 | Van Luchene |
| 2007/0129126 A1 | 6/2007 | Van Luchene |
| 2007/0168298 A1* | 7/2007 | George et al. ............... 705/75 |
| 2007/0168309 A1 | 7/2007 | Tzruya et al. |
| 2007/0192727 A1* | 8/2007 | Finley et al. ............... 715/781 |
| 2007/0214249 A1* | 9/2007 | Ahmed et al. ............... 709/223 |
| 2007/0218987 A1 | 9/2007 | Van Luchene et al. |
| 2007/0225071 A1 | 9/2007 | Van Luchene et al. |
| 2007/0238499 A1 | 10/2007 | Wright |
| 2007/0240119 A1 | 10/2007 | Ducheneaut et al. |
| 2008/0004116 A1* | 1/2008 | Van Luchene et al. ......... 463/42 |
| 2008/0059329 A1* | 3/2008 | Luchene et al. ............... 705/26 |
| 2008/0203151 A1 | 8/2008 | Dixon et al. |
| 2008/0220876 A1 | 9/2008 | Mehta et al. |
| 2008/0263460 A1* | 10/2008 | Altberg et al. ............... 715/757 |
| 2008/0301056 A1 | 12/2008 | Weller et al. |
| 2008/0319869 A1 | 12/2008 | Carlson et al. |
| 2010/0036741 A1 | 2/2010 | Cleven |
| 2010/0114740 A1 | 5/2010 | Dominguez et al. |
| 2010/0117792 A1 | 5/2010 | Faith et al. |
| 2010/0179909 A1 | 7/2010 | Dana |
| 2010/0180326 A1 | 7/2010 | Sheets et al. |
| 2010/0217709 A1 | 8/2010 | Aabye et al. |
| 2010/0262546 A1 | 10/2010 | Sahota et al. |
| 2010/0270374 A1 | 10/2010 | Hill et al. |
| 2010/0274688 A1 | 10/2010 | Hammad |
| 2010/0293382 A1 | 11/2010 | Hammad |
| 2010/0327054 A1 | 12/2010 | Hammad |
| 2011/0055077 A1 | 3/2011 | French et al. |
| 2011/0093397 A1 | 4/2011 | Carlson et al. |
| 2011/0119155 A1 | 5/2011 | Hammad et al. |

OTHER PUBLICATIONS

Shayotovich, E.; "Taxing Virtual Earning—Seriously"; Business Week, May 2, 2006, 3 pages.

Walker, R.; "Selling to Avatars"; New Your Times, Oct. 1, 2006, 2 pages.

U.S. Appl. No. 12/842,927, filed Jul. 23, 2010, 40 pages.
U.S. Appl. No. 13/038,181, filed Mar. 1, 2011, 34 pages.
U.S. Appl. No. 13/039,102, filed Mar. 1, 2011, 56 pages.
U.S. Appl. No. 13/069,140, filed Mar. 22, 2011, 33 pages.
U.S. Appl. No. 13/074,245, filed Mar. 29, 2011, 48 pages.
U.S. Appl. No. 13/081,871, filed Apr. 7, 2011, 38 pages.
U.S. Appl. No. 13/086,008, filed Apr. 13, 2011, 49 pages.
U.S. Appl. No. 61/329,022, filed Apr. 28, 2010, 15 pages.
U.S. Appl. No. 61/363,523, filed Jul. 12, 2010, 15 pages.
U.S. Appl. No. 61/365,119, filed Jul. 16, 2010, 15 pages.
U.S. Appl. No. 61/365,737, filed Jul. 19, 2010, 15 pages.
U.S. Appl. No. 61/379,990, filed Sep. 3, 2010, 15 pages.
U.S. Appl. No. 61/406,071, filed Oct. 22, 2010, 84 pages.
U.S. Appl. No. 61/407,423, filed Oct. 27, 2010, 83 pages.
U.S. Appl. No. 61/468,646, filed Mar. 29, 2011, 53 pages.
U.S. Appl. No. 61/496,470, filed Jun. 13, 2011, 22 pages.
U.S. Appl. No. 61/526,969, filed Aug. 24, 2011, 25 pages.

* cited by examiner

APPARATUS AND METHOD FOR SECURE FULFILLMENT OF TRANSACTIONS INVOLVING VIRTUAL ITEMS

CROSS-REFERENCE TO RELATED APPLICATION

This application claims the benefit of U.S. Provisional Patent Application Ser. No. 60/950,404, filed Jul. 18, 2007, entitled, "System and Method for Secure Fulfillment of Transactions Involving Virtual Items".

FIELD OF THE INVENTION

This invention relates generally to networked computer games. More particularly, this invention relates to executing financial transactions in virtual environments.

BACKGROUND OF THE INVENTION

Massively multiplayer online games (MMOGs) are online computer games capable of supporting hundreds or thousands of players simultaneously. Millions of users worldwide have created a virtual identity (alter-ego) on various MMOGs and other virtual online worlds. Users of virtual worlds spend hundreds of hours playing and creating their virtual identities and winning various virtual items and currencies. With attainment of such virtual items comes the desire to trade or otherwise transact for other virtual items. Currently, there does not exist a transaction mechanism that guarantees completion of such transactions for virtual items before payment. For example, existing virtual trading mechanism are often subject to fraud since it is difficult to authenticate the identities of the parties and items involved in such virtual worlds. As a result, the market for trading and transacting virtual items has languished, waiting for a transaction mechanism that guarantees completion of the transaction before payment.

SUMMARY OF THE INVENTION

In one general aspect, the present invention is directed to systems and methods which provide for secure fulfillment of transactions involving virtual items. According to various embodiments, the system can provide proof that the virtual item(s) was delivered and paid for when two independent parties meet in an online or virtual market and decide to complete a transaction. The marketplace can then disperse the moneys to the respective parties securely.

The invention includes a computer implemented method to exchange virtual goods in a virtual environment by receiving funds at a trading platform from a buyer. The buyer is provided with a first secret that the buyer can decrypt and a second secret that the buyer cannot decrypt. The buyer is authenticated to a seller using the first secret. A virtual item is delivered from the seller to the buyer in response to authenticating. The buyer delivers to the seller the second secret for decryption by the seller. The seller is authenticated at the trading platform with the second secret. The seller is supplied with the funds.

The invention also includes a computer implemented method to exchange virtual goods in a virtual environment by listing virtual goods. A buyer is supplied with a first secret encrypted to a buyer key and a second secret encrypted to a seller key. The buyer is authenticated to a seller using the first secret. A virtual item is delivered from the seller to the buyer in response to authenticating. The buyer delivers the second secret to the seller. The seller is authenticated at a trading platform with the second secret to receive buyer funds.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
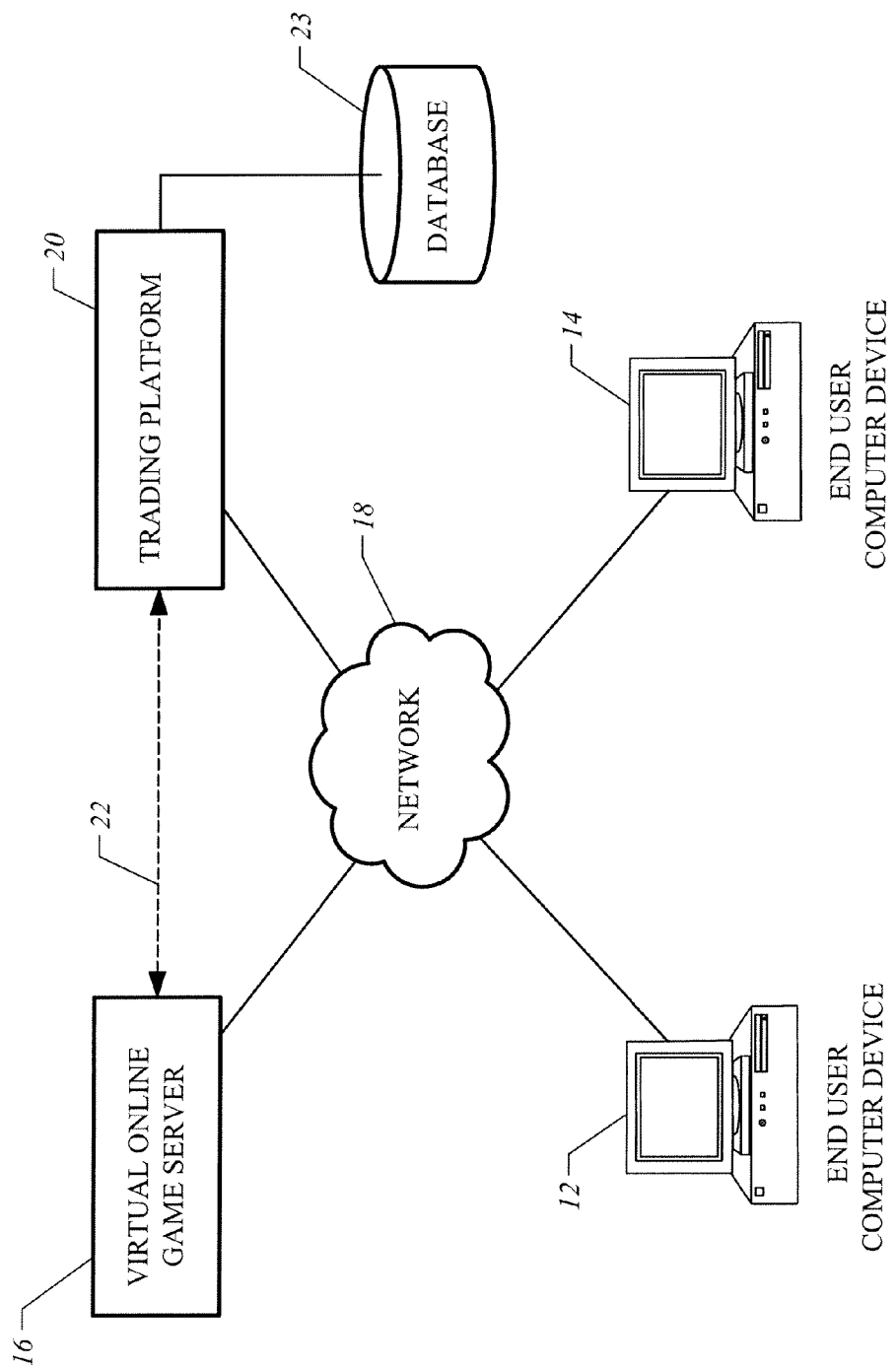
FIG. 1 is a diagram of a system configured in accordance with an embodiment of the invention.

FIG. 1 is a diagram of a system 10 to support virtual item transactions according to an embodiment of the invention. As shown in FIG. 1, numerous end users (e.g., virtual online game players) using their end user computer devices 12, 14, may play a virtual online game provided by virtual online game server 16. The end users computer devices 12, 14 may be connected to the virtual online game server 16 via a network 18, such as the Internet or some other type of computer network. The end user computer devices 12, 14 may be, for example, personal computers, laptops, handheld computers, or any other processor-based computer device capable of logging into and playing such online virtual games.

The system 10 may also include a virtual item trading platform 20 connected to the network 18. The virtual item trading platform 20 may provide a virtual marketplace for items in the virtual worlds of the games provided by the virtual online game server 16. For instance, players of the virtual online game (e.g., end users at the end user computer devices 12, 14) may list items they have acquired in the game for trade, sale or other type of exchange in the marketplace provided by the virtual item trading platform 20. The virtual trade trading platform may comprise one or a number of networked servers and may be a virtual item trading platform as described in U.S. patent application Ser. No. 11/974,861, filed Oct. 16, 2007, which is incorporated herein by reference. The trading platform 20 may also have a dedicated connection 22 to the game server 16.

Figure 3:
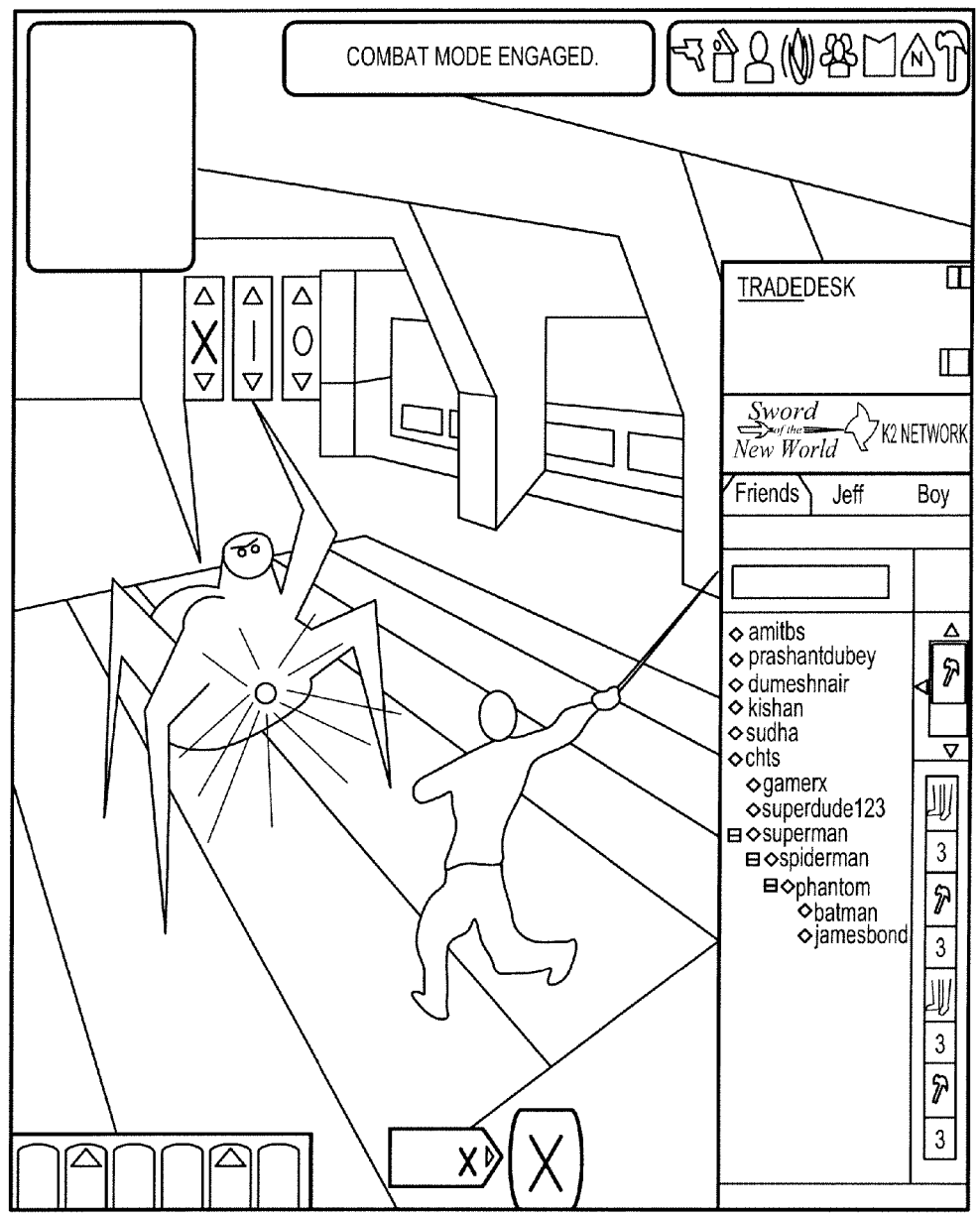
FIG. 3 is a diagram depicting a user toolbar utilized in accordance with an embodiment of the invention.

End users may download a toolbar from the virtual online trading platform 20 that is displayed for the end user on the end user's computer device 12, 14, when the end user is playing the virtual online game provided by the virtual online game server 16. An example of such a toolbar 24 is shown in FIG. 3. The toolbar 24 may be transparent and overlay the graphics from the game, as shown in FIG. 3. End users may use the toolbar to list item with the broker's marketplace for exchange, view items listed by other end users for exchange, etc. The virtual item trading platform 20 may also broker the exchange of virtual items transacted between end users in a manner that ensures the secure exchange of the virtual item between the end users prior to payment.

Figure 2:
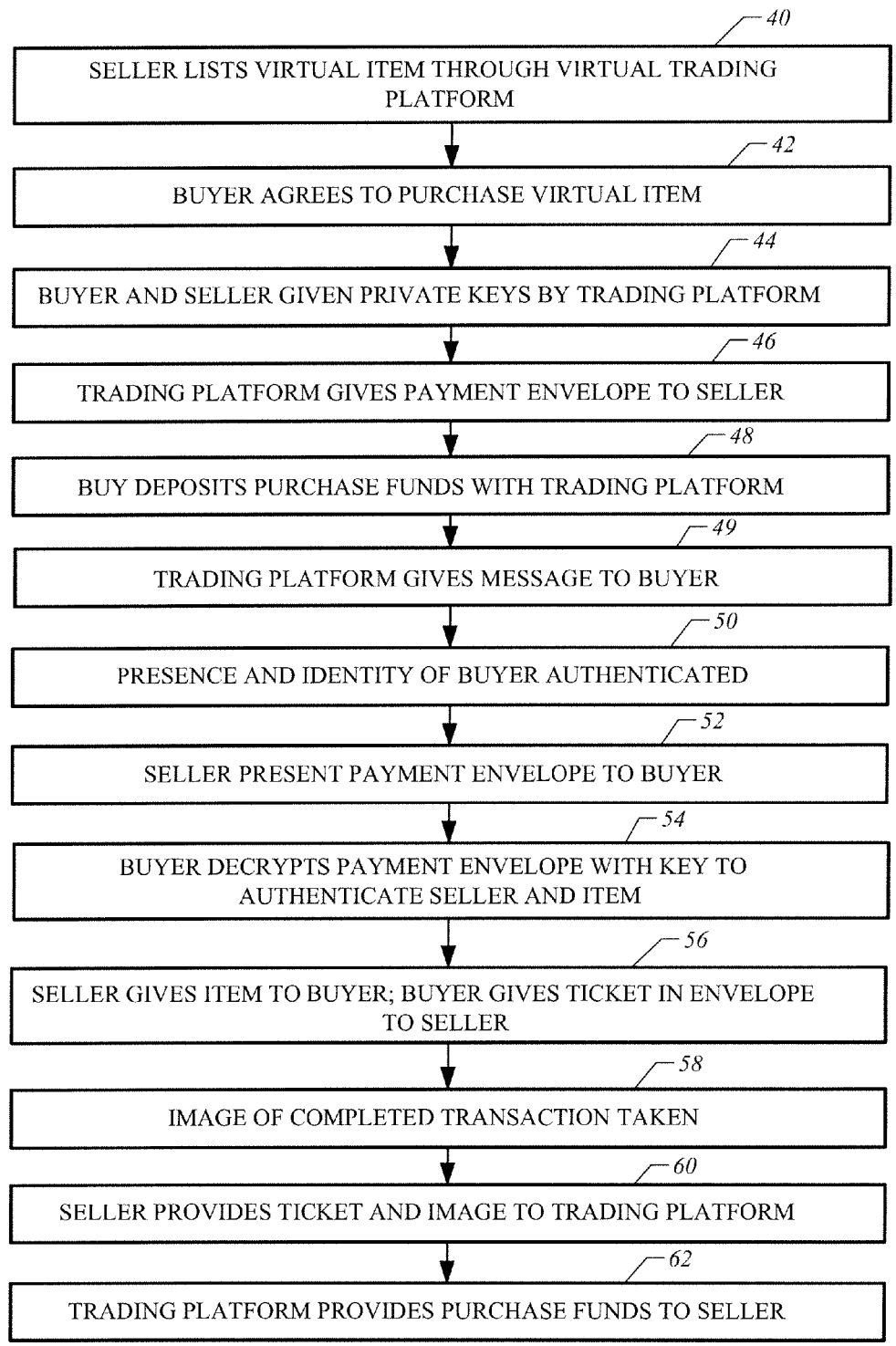
FIG. 2 is a flowchart of a process utilized in accordance with an embodiment of the invention.

FIG. 2 is a flowchart describing the process of how the secure fulfillment of an exchange of a virtual item prior to payment for the item may be accomplished according to various embodiments of the present invention. For the purposes of this example, assume that the end user at the end user computer device 12 is the seller of the virtual item (hereinafter referred to as "seller 12") and that the end user at the end user computer device 14 is the buyer of the virtual item (hereinafter referred to as "buyer 14"). As such, at step 40, the seller 12 may list the virtual item for sale through the virtual item marketplace provided by the virtual item trading platform 20. At step 42, the buyer 14 agrees to purchase the item for a price P. At step 44, once the trading platform 20 has been notified as to the agreement, the trading platform 20 provides both the seller 12 and the buyer 14 with a unique private key. For example, the trading platform may deliver the keys to an avatar associated with the seller 12 and an avatar associated with the buyer 14. A subsequent exchange of keys operates as proof of delivery of virtual goods. The private keys allow the seller 12 and buyer 14 to decrypt messages from the trading platform 20, which are used as part of the transaction process, as described further below. The trading platform 20 may be notified of the agreement via the interface of the trading platform (e.g., the toolbar 24 or some other interface) or via email, for example.

At step 46, the trading platform 20 provides a payment envelope to the seller 12. The payment envelope may be encrypted in the seller's key so that the seller 12 can receive it privately and reliably. The trading platform 20 may additionally sign a digest of the payment envelope to prove that it is authentic. Next, at step 48, the buyer 14 deposits the purchase price with the trading platform 20 or some other escrow agent for the transaction. Any suitable online payment technique may be used for depositing the funds.

Next, at step 49, the trading platform 20 provides the buyer 14 with a first message that may contain (i) a description of the transaction, (ii) a date, and (iii) a secret that only the buyer 14 can decrypt using the buyer's public/private keys. The secret may comprise two things: a buyer secret code and another (second) encrypted message. The buyer secret code may be, for example, a random sixteen digit number. The second encrypted message may contain a seller secret code that is encrypted in the key of the seller 12. Thus, in such an embodiment, the first message received by the buyer 14 may have the following format:
{Buyer's Secret, Transaction Description, {Seller's Secret, Transaction Description}K(seller)}$K_{(buyer)}$
where {Message}$_{K(x)}$ indicates that the content "Message" has been encrypted by the trading platform 20 in x's private key. So, the message above indicates the original message sent to the buyer 14 is encrypted in the buyer's key, but contains another message encrypted in the seller's key. The buyer 14 may give the second encrypted message to the seller 12 when the exchange of the virtual item occurs, as described further below. Like the buyer's secret code, the seller's secret code may be a random sixteen digit number.

Once the seller 12 has the payment envelope and the buyer 14 has received the first message after depositing the purchase price with the trading platform 20, delivery of the virtual item may take place pursuant to the agreed upon transaction. In order to do this, the virtual characters for the seller 12 and the buyer 14 meet in their virtual world. The trading platform 20 may facilitate the meeting by detecting the presence of the seller 12 and the buyer 14 in the virtual world. In one embodiment, the trading platform 20 may detect the presence of the parties by analyzing the executable files of the game server 16. In that connection, the trading platform 20 may include a database 23 (see FIG. 1) that maps the executable files to particular places in the virtual world. That is, by analyzing and interpreting the executable files running on the game server 16, the trading platform 20 can determine the location, or presence, of game participants in the virtual world based on the mappings in the database 23 to particular locations in the game. In another embodiment, the trading platform 20 may have an API (application programming interface) that interfaces with the game server 16 so that, through the API, the game server 16 can provide the relevant location information for the participants to the trading platform 20.

Therefore, in one example, at step 50, the trading platform 20 could detect the presence of the buyer 14 at the agreed-upon location for the exchange of the virtual item. Further, to authenticate the buyer, the buyer 14 may send back to the trading platform 20 the buyer's secret code contained in the message received at step 49. That way, the trading platform 20 can authenticate the buyer 14 since only the buyer 14 will have the code, which was encrypted with the seller's key.

Once the trading platform locates and authenticates the buyer 14, the trading platform could send a message to the seller 12 to go to the location to complete the transaction. The messages from the buyer to the trading platform 20 and the message from the trading platform 20 to the seller may be done via instant messaging using the toolbar 24 (see FIG. 3). In other embodiments, the message may be sent via email or other suitable means.

Once the buyer 14 and the seller 12 meet at the agreed upon location in the game for the exchange, the seller 12, at step 52, may present the payment envelope to the buyer. The buyer 14, at step 54, may then decrypt the payment envelope with the buyer's key to authenticate the seller 12, the item, and the transaction. The seller's virtual avatar may then, at step 56, give the virtual item to the buyer's avatar, and the buyer 14 may then give the seller's secret code to the seller 12 (e.g., the secret code given to the buyer at step 49).

In addition, according to various embodiments, the seller 12 and/or the buyer 14 may capture an image of the completed transaction in the virtual world using the camera function 26 in the toolbar 24 (see FIG. 3) at step 58. The image may capture the buyer 14 holding the virtual item that is the subject of the transaction so that the image evidences delivery of the item prior to payment. An image of a decrypted secret may also be used to provide delivery of an item. Alternately, or in addition, an image of a description of an item together with an actual picture of the item may be used for transaction verification.

Then, at step 60, the seller 12 may decrypt the seller's secret code using the seller's key and send the code, along with the image of the transaction, to the trading platform 20. These items may authenticate completion of the transaction, in which ease, at step 62, the trading platform 20 may deliver the purchase proceeds, which the trading platform was holding in escrow, to the seller 12.

In such a transaction scenario, the fact that the seller 12 has the seller's secret code evidences that the seller 12 has communicated with the appropriate buyer 14 and received the seller's secret code from the buyer 14. This transaction scenario is capable of thwarting many fraudulent tactics used in current virtual world transactions. For instance, the buyer 14 cannot later deny that it accepted the item because (i) the seller 12 has the seller's secret message given to the seller 12 by the buyer 14 at the time of the exchange, and (ii) the image showing the buyer 14 in possession of the item. Also, the seller cannot ask for payment without delivering the item because (i) the seller will not have the seller's secret code given to it by the buyer at the time of the exchange and (ii) there will be no captured image of the buyer in possession of the item.

In the embodiment shown in FIG. 1, only one game server 16 is shown. It should be recognized that in other embodiments, the trading platform 20 may provide the transaction functionality for a number of game servers 16. That is, the trading platform 20 may facilitate virtual item transactions using the above-described processes in a number of different virtual worlds. In such an embodiment, the database 23 preferably stores mappings for each such virtual world so that the trading platform 20 can detect the presence of characters in the different virtual worlds.

Figure 4:
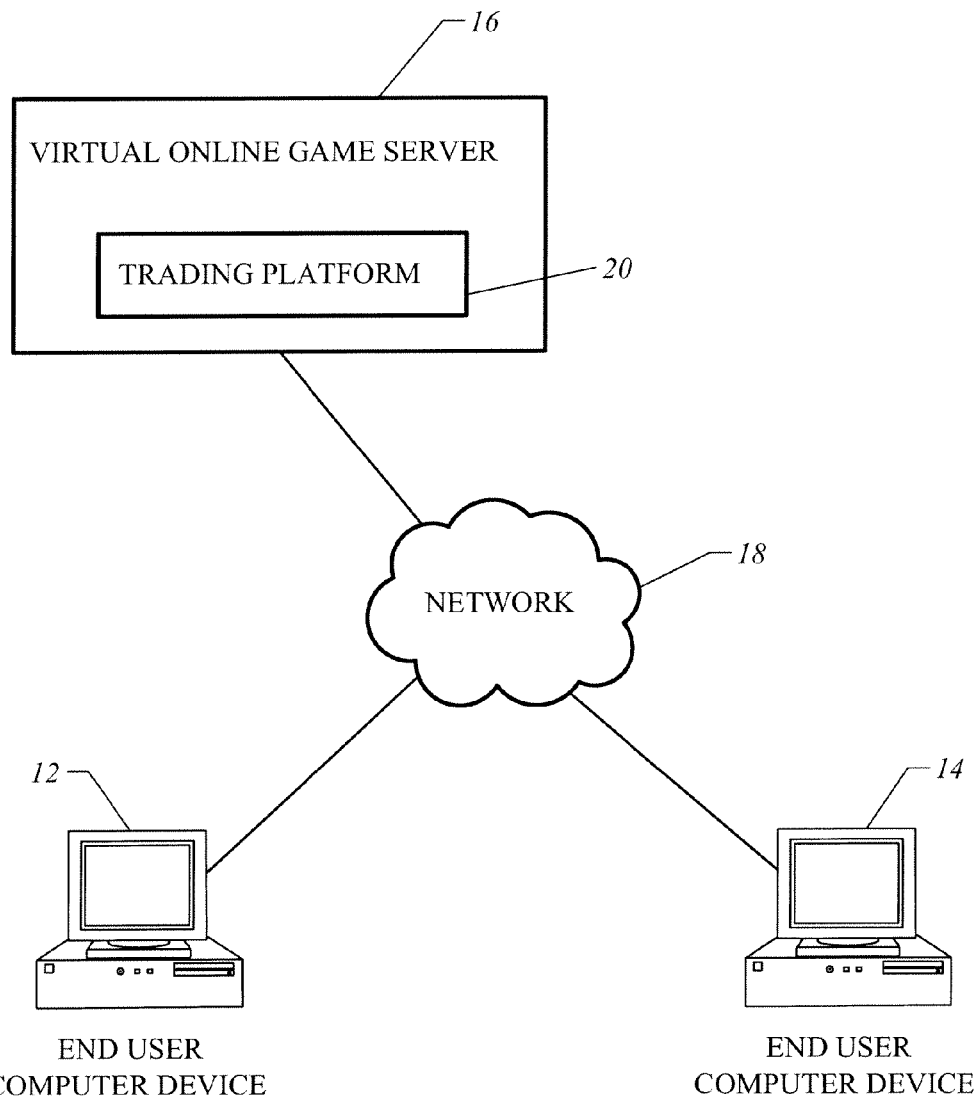
FIG. 4 is a diagram of a system according to another embodiment of the invention.

In other embodiments, as shown in FIG. 4, the trading platform 20 could be integrated with the game server 16. That is, the game server 16 could supply the functionality of the trading platform 20 regarding the transaction process rather than having a third-party marketplace provide the functionality, as in the embodiment of FIG. 1.

An embodiment of the present invention relates to a computer storage product with a computer readable storage medium having computer code thereon for performing various computer implemented operations. The media and computer code may be those specially designed and constructed for the purposes of the present invention, or they may be of the kind well known and available to those having skill in the computer software arts. Examples of computer readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method comprising:
receiving funds from a buyer at a trading platform comprising a computer system;
encrypting, by the computer system using a seller key, a first message that includes a seller secret;
encrypting, by the computer system using a buyer key, a second message that includes a buyer secret and the encrypted first message;
providing, by the computer system, the buyer with the encrypted second message;
detecting, by the computer system prior to delivery of a virtual item, a presence of the buyer at a virtual location in a game where an exchange of the virtual item between the buyer and seller is to occur;
authenticating the buyer, by the computer system, using the buyer secret;
in response to and after authenticating the buyer and detecting the buyer at the virtual location, sending a third message to the seller to go to the virtual location;
detecting, by the computer system, that the seller arrives at the virtual location;
delivering the virtual item from the seller to the buyer at the virtual location;
delivering the encrypted first message from the buyer to the seller and obtaining the seller secret by decrypting by the seller the encrypted first message;
authenticating, by the computer system, the seller using the seller secret; and
supplying, by the computer system, the seller with the funds.

2. The computer implemented method of claim 1 further comprising listing, by the computer system, the virtual item at the trading platform.

3. The computer implemented method of claim 1 further comprising delivering, by the computer system, the buyer key from the trading platform to a buyer avatar associated with the buyer and the seller key to a seller avatar associated with the seller.

4. The computer implemented method of claim 1 further comprising supplying, by the computer system, a payment envelope to the seller.

5. The computer implemented method of claim 4 wherein the payment envelope is subsequently supplied to the buyer, by the seller.

6. The computer implemented method of claim 1 wherein an image of buyer in possession of the virtual item is taken.

7. The computer implemented method of claim 6 further comprising receiving the image at the trading platform.

8. The computer implemented method of claim 1 wherein an image of a decrypted secret is taken to prove delivery of the virtual item.

9. The computer implemented method of claim 8 wherein an image of a description of the virtual item is taken.

10. The computer implemented method of claim 9 further comprising receiving the image of the decrypted secret and the image of the description at the trading platform.

11. The computer implemented method of claim 1 wherein a toolbar is utilized to support communications between the trading platform, buyer and seller, wherein the trading platform provides an exchange for exchanging virtual goods.

12. The computer implemented method of claim 1 wherein the seller secret and the buyer secret are numbers.

13. The computer implemented method of claim 12 further comprising determining, by the computer system, the virtual location for delivery of the virtual item.

14. The computer implemented method of claim 12 wherein the trading platform further comprises a database that maps executable files to particular places in a virtual world of the game.

15. The computer implemented method of claim 14 wherein the trading platform is in operative communication with a game server.

16. The computer implemented method of claim 14 wherein the buyer and seller are players in the game provided by the game server, and wherein the funds supplied to the seller is in response to the transaction in the virtual world for the virtual good.

17. The computer implemented method of claim 14 wherein the presence of the buyer at the virtual location is detected by receiving location information from the game server.

18. The computer implemented method of claim 15 wherein the presence of the buyer at the virtual location is detected by analyzing the executable files.

19. The computer implemented method of claim 1 wherein the second message further comprises a description of the transaction.

20. The computer implemented method of claim 19 wherein the second message further comprises a date.

21. The computer implemented method of claim 19 wherein the description of the transaction is also included in the first message.

* * * * *